United States Patent
Ding et al.

(10) Patent No.: US 10,339,358 B2
(45) Date of Patent: Jul. 2, 2019

(54) PALMPRINT RECOGNITION CIRCUIT BASED ON LTPS TECHNOLOGY, A PALMPRINT RECOGNITION METHOD AND A DISPLAY SCREEN

(71) Applicants: BOE Technology Group Co., Ltd., Beijing (CN); Beijing BOE Optoelectronics Technology Co., Ltd., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Shengji Yang, Beijing (CN); Lei Wang, Beijing (CN); Wei Liu, Beijing (CN); Weijie Zhao, Beijing (CN); Changfeng Li, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 267 days.

(21) Appl. No.: 15/300,107

(22) PCT Filed: Sep. 29, 2015

(86) PCT No.: PCT/CN2015/091038
§ 371 (c)(1),
(2) Date: Sep. 28, 2016

(87) PCT Pub. No.: WO2017/000405
PCT Pub. Date: Jan. 5, 2017

(65) Prior Publication Data
US 2018/0173925 A1    Jun. 21, 2018

(30) Foreign Application Priority Data

Jun. 29, 2015    (CN) .......................... 2015 1 0368475

(51) Int. Cl.
     *G06K 9/00*          (2006.01)
     *G09G 3/36*          (2006.01)

(52) U.S. Cl.
     CPC ....... *G06K 9/0004* (2013.01); *G06K 9/00885* (2013.01); *G06K 9/001* (2013.01); *G06K 9/0008* (2013.01); *G09G 3/3677* (2013.01)

(58) Field of Classification Search
     CPC ................ G06K 9/00–9/0012; G06K 9/00885
     See application file for complete search history.

(56) References Cited

U.S. PATENT DOCUMENTS

| 7,679,044 B2 | 3/2010 | Morosawa |
| 2007/0024546 A1* | 2/2007 | Jang .................... G06K 9/0002 345/78 |

(Continued)

FOREIGN PATENT DOCUMENTS

| CN | 201075237 Y | 6/2008 |
| CN | 101377438 A | 3/2009 |

(Continued)

OTHER PUBLICATIONS

First Office Action from Chinese Patent Application No. 201510368475.0, dated Oct. 26, 2017, 17 pages.

(Continued)

*Primary Examiner* — Sean T Motsinger
(74) *Attorney, Agent, or Firm* — Westman, Champlin & Koehler, P.A.

(57) ABSTRACT

The disclosure provides a palmprint recognition circuit based on a LTPS technology, a palmprint recognition method and a display screen. The palmprint recognition circuit comprises an optical signal collecting unit, config- (Continued)

ured to collect an optical signal indicating a palmprint information and convert the collected optical signal into a current signal; a current signal amplifying unit, configured to amplify the converted current signal; and a current signal detecting unit, and configured to detect an intensity of the amplified current signal which indicates a ridge line or a valley line of the palmprint in the palmprint information. Therefore, it can solve the problem of having no palmprint recognition circuit and method for a LTPS-TFT display panel. This can eliminate an influence of a change of parasitic capacitance on the recognition result, wherein the change of parasitic capacitance is caused by a change of a wiring manner in the circuit.

12 Claims, 3 Drawing Sheets

(56) References Cited

U.S. PATENT DOCUMENTS

| | | | | |
|---|---|---|---|---|
| 2009/0058502 | A1* | 3/2009 | Morosawa | G01J 1/32 327/514 |
| 2010/0308212 | A1 | 12/2010 | Tanaka et al. | |
| 2011/0001711 | A1* | 1/2011 | Choi | G06F 3/0412 345/173 |
| 2016/0092717 | A1* | 3/2016 | Ling | G06K 9/0004 382/125 |
| 2017/0293791 | A1* | 10/2017 | Mainguet | G06K 9/0002 |
| 2018/0173925 | A1* | 6/2018 | Ding | G06K 9/0004 |

FOREIGN PATENT DOCUMENTS

| | | |
|---|---|---|
| CN | 101989152 A | 3/2011 |
| CN | 104112120 A | 10/2014 |
| CN | 104318205 A | 1/2015 |
| CN | 104463107 A | 3/2015 |
| CN | 104915657 A | 9/2015 |

OTHER PUBLICATIONS

International Search Report and Written Opinion, including English translation of Box No. V of the Written Opinion, for International Application No. PCT/CN2015/091038, dated Apr. 1, 2016, 13 pages.

* cited by examiner

PALMPRINT RECOGNITION CIRCUIT BASED ON LTPS TECHNOLOGY, A PALMPRINT RECOGNITION METHOD AND A DISPLAY SCREEN

CROSS-REFERENCE TO RELATED APPLICATION(S)

This application is a Section 371 National Stage application of International Application No. PCT/CN2015/091038, filed on 29 Sep. 2015, and claims priority to Chinese Application No. 201510368475.0 entitled "A Palmprint Recognition Circuit Based on LTPS Technology, A Palmprint Recognition Method and A Display Screen", filed on Jun. 29, 2015, the contents of which are incorporated herein by reference in their entirety.

TECHNICAL FIELD

The present disclosure relates to a field of information recognition, more particular, relates to a palmprint recognition circuit based on a low temperature poly-silicon (LTPS) technology, a palmprint recognition method and a display screen.

BACKGROUND

In the late 1990s, the Hong Kong Polytechnic University and Tsinghua University pioneered a palmprint recognition technology research. The palmprint recognition has a plurality of advantages such as a high accuracy, a fast speed, a low cost, a high popularity and the like.

The most important feature in a palmprint is line feature, such as a ridge line and a valley line. The clearest line in the line feature substantially does not change along one's life. When a palm is placed on the surface of a palmprint detecting glass panel, the detection of the palmprint can be realized based on differences of a light reflected by different line features on a palm.

The low temperature poly-silicon technology is a branch of the poly-silicon technology. For a LCD display panel, there are a lot of advantages for utilizing a poly-silicon liquid crystal material, for example, the thin film transistor circuit can become thinner and smaller, and can have a lower power consumption. The electron mobility of a display panel based on a LTPS thin film transistor can reach 200 $cm^2$/V-sec or more, it can effectively reduce the area of the thin film transistor, thereby improving the aperture ratio. This can improve the brightness of the display panel and also reduce overall power consumption. Furthermore, the high electron mobility can integrate a part of the driving circuit onto a glass substrate, which can not only reduce the number of the driving ICs, but also improve the reliability of the liquid crystal display panel significantly, so that the manufacturing cost of the panel can be greatly reduced.

Thus, there is a need for a palmprint recognition circuit based on the LTPS technology and for a palmprint recognition method.

SUMMARY

In view of above, the present disclosure provides a palmprint recognition circuit based on LTPS technology, a palmprint recognition method and a display screen, which can solve the problem of having no palmprint recognition circuit and method for a LTPS-TFT display panel in the market. This can eliminate an influence of a change of parasitic capacitance on the recognition result, wherein the change of parasitic capacitance is caused by a change of a wiring manner in the circuit.

According to one aspect of the present disclosure, a palmprint recognition circuit based on a low temperature poly-silicon technology is provided, which may comprise:

an optical signal collecting unit, configured to collect an optical signal indicating a palmprint information and to convert the collected optical signal into a current signal, wherein the optical signal is obtained when a light emitted from a back light being reflected by a palmprint of a user palm;

a current signal amplifying unit, connected to the optical signal collecting unit and configured to amplify the converted current signal; and a current signal detecting unit, connected to the current signal amplifying unit and configured to detect an intensity of the amplified current signal which indicates a ridge line or a valley line of the palmprint in the palmprint information.

Preferably, the optical signal collecting unit comprises a photoelectric conversion device configured to convert the collected optical signal into the current signal, wherein the converted current signal is proportional to the collected optical signal, and the photoelectric conversion device is a LTPS thin film transistor.

Preferably, the optical signal collecting unit further comprises a first transistor, a second transistor and a first capacitor, wherein the first transistor has a first electrode connected to a second electrode of the photoelectric conversion device, a second electrode connected to a first terminal of the first capacitor, and a gate connected to a transfer controlling terminal, and the first transistor is configured to transfer the converted current signal to the first capacitor which stores the transferred current signal as a data voltage signal, under the control of the transfer controlling terminal; and the second transistor has a first electrode connected to a first terminal of the first capacitor, a second electrode connected to a second terminal of and the first capacitor, and a gate connected to a first resetting terminal, and the second transistor is configured to cause the first capacitor to discharge, under the control of the first resetting terminal.

Preferably, the current signal amplifying unit further comprises a third transistor, a fourth transistor, a fifth transistor, a sixth transistor, a seventh transistor, an eighth transistor and a second capacitor, wherein the fourth transistor has a gate connected to a gate line, a first electrode connected to the first terminal of the first capacitor, and a second electrode connected to a first terminal of the second capacitor; the eighth transistor has a second electrode connected to the second terminal of the second capacitor, a gate connected to the gate line, and a first electrode connected to a first terminal of the third transistor, wherein the fourth transistor and the eighth transistor are turned on under the control of the gate line, so as to input the data voltage signal from the first capacitor into the first terminal of the second capacitor, the second terminal of the second capacitor is connected to a gate of the third transistor, so as to input the data voltage signal into the gate of the third transistor, the fifth transistor has a gate connected to a first light-emitting controlling terminal, a first electrode connected to the first terminal of the second capacitor, and a second electrode connected to a high voltage terminal, wherein when the fifth transistor is turned on under the control of the first light-emitting controlling terminal, a voltage at the first terminal of the second capacitor is changed into a high voltage, so that a voltage at the second terminal of the second capacitor is capable of cancelling out a threshold voltage of the third transistor, and the third transistor has the first electrode connected to a first electrode of the sixth transistor and a second electrode connected to a first electrode of the photoelectric conversion device, and the gate of the sixth transistor is connected to a second light-emitting controlling terminal, wherein the sixth transistor is turned on under the control of the second light-emitting controlling terminal, and the amplified current signal outputted from the second electrode of the sixth transistor is independent from the threshold voltage of the third transistor, so that the amplified current signal remains stable.

Preferably, the current signal detecting unit comprises:

a first switch, of which a turn off time is controlled by a clock, such that during the turn off time, a lead-to-ground capacitor in the current signal detecting unit and a reference capacitor inside a chip are charged by the amplified current signal;

an operational amplifier, connected to the first switch in series, and configured to detect the intensity of the amplified current signal, during a turn on time of the first switch;

a third capacitor, connected to the operational amplifier in parallel; and a second switch, connected to the third capacitor in parallel, and configured to be turned on during the turn off time of the first capacitor, so as to cause the third capacitor to discharge, wherein the detected current signal outputted from the operational amplifier only relates to a capacitance of the third capacitor and the turn off time of the first switch.

According to another aspect of the present disclosure, a palmprint recognition method based on a low temperature poly-silicon technology is provided, which may comprise the steps of:

collecting an optical signal indicating a palmprint information and converting the collected optical signal into a current signal, by an optical signal collecting unit, wherein the optical signal is obtained when a light emitted from a back light being reflected by the palmprint of a user palm;

amplifying the converted current signal by a current signal amplifying unit; and detecting an intensity of the amplified current signal which indicates a ridge line or a valley line of the palmprint in the palmprint information, by a current signal detecting unit.

Preferably, the converted current signal is proportional to the collected optical signal.

Preferably, the method further comprises: compensating for a threshold voltage of a driving transistor in the current signal amplifying unit, so as to keep the amplified current signal stable.

Preferably, the current signal detecting unit comprises a first switch, of which turn off time is controlled by a clock, such that during the turn off time, a lead-to-ground capacitor in the current signal detecting unit and a reference capacitor inside a chip are charged by the amplified current signal.

Preferably, the current signal detecting unit further comprises an operational amplifier connected to the first switch in series, wherein the intensity of the amplified current signal is detected via an output voltage from the operational amplifier, during a turn on time of the first switch.

Preferably, the current signal detecting unit further comprises a third capacitor connected to the operational amplifier in parallel, wherein the detected current signal outputted from the operational amplifier only relates to a capacitance of the third capacitor and the turn off time of the first switch, and is independent from the lead-to-ground capacitor in the current signal detecting unit and the reference capacitor inside the chip.

According to still another aspect of the disclosure, a display screen comprising the above palmprint recognition circuit is provided.

The present disclosure provides a palmprint recognition circuit, a palmprint recognition method and a display screen by utilizing a LTPS technology, which is capable of detecting a palmprint based on differences of reflection of a light emitted by a backlight by different line features on a palm such as, a ridge line or a valley line. Therefore, it can solve the problem of having no palmprint recognition circuit and method for a LTPS-TFT display panel in the market. In particular, the palmprint recognition circuit may have three units, i.e. an optical signal collecting unit, a current signal amplifying unit and a current signal detecting unit. Firstly, a photoelectric conversion device (i.e. a LTPS thin film transistor) in the optical signal collecting unit can convert a collected reflected light into a current value, and store it into a storage capacitor. Then, the current value is amplified by the current signal amplifying unit and stored into a lead-to-ground capacitor in the current signal detecting unit and a reference capacitor inside a chip. Finally, the current signal detecting unit may detect an intensity of the current signal indicating the optical signal, and distinguish the ridge line and the valley line of the palm based on the detected intensity of the current signal. This can eliminate an influence of a change of parasitic capacitance on the recognition result, wherein the change of parasitic capacitance is caused by a change of a wiring manner in the circuit.

BRIEF DESCRIPTION OF THE DRAWINGS

The above and other aspects, features and advantages will be more apparent from the following description taken in conjunction with the accompanying drawings, in which.

Throughout the drawings, like reference numerals will be understood to refer to like parts, components, and structures.

DETAILED DESCRIPTION

Specific implementations of the present disclosure will be described in detail below in conjunction with accompanying drawings and specific embodiments.

Figure 1:
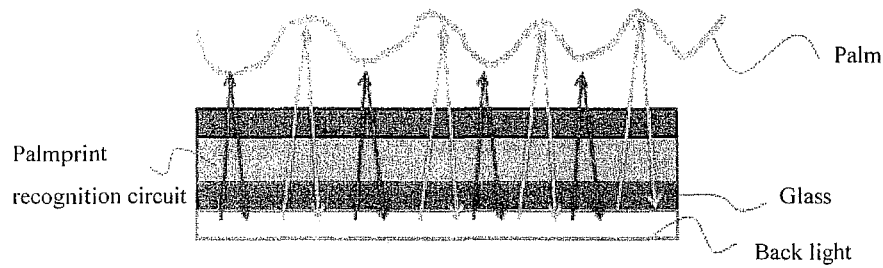
FIG. 1 is a diagram illustrating a laminated structure comprising a palmprint recognition circuit based on a LTPS technology according to an embodiment of the present disclosure.

With reference to FIG. 1, FIG. 1 is a diagram illustrating a laminated structure comprising a palmprint recognition circuit based on a LTPS technology according to an embodiment of the present disclosure. In such a laminated structure, a backlight layer, a glass layer, a palmprint recognition circuit layer and the like are sequentially disposed from bottom to top. When a user puts his/her palm on a top surface of the laminated structure, a light emitted from the backlight layer will be reflected by line features on the palm such as, a ridge line or a valley line, and then arrive at the palmprint recognition circuit layer. The palmprint recognition circuit can recognize the palm by detecting the difference between the intensity of the ridge line and the intensity of the valley line. With respect to a valley line, the light emitted from the backlight layer is totally reflected at the valley line. Thus, the intensity of the light reflected at the valley line is high. On the contrary, the intensity of the light reflected at the ridge line is relatively low. Thus, the detection of the palm can be realized by distinguishing a valley line from a ridge line based on the intensity of the light. Furthermore, such a palmprint recognition circuit based on a LTPS technology can either be applied as a independent palmprint recognition device, or be integrated into a LCD or OLED device for cooperating.

Figure 2:
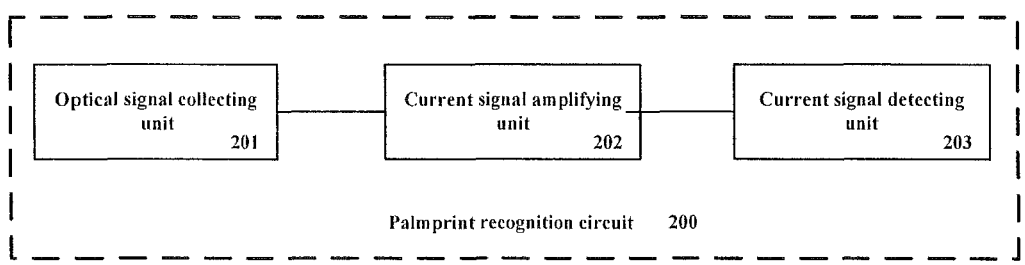
FIG. 2 is a block diagram illustrating the palmprint recognition circuit according to the embodiment of the present disclosure.

In the following, a specific structure of the palmprint recognition circuit based on the LTPS technology is described in detail. FIG. 2 is a block diagram illustrating the palmprint recognition circuit 200 based on the LTPS technology according to the embodiment of the present disclosure. The palmprint recognition circuit 200 may comprise an optical signal collecting unit 201, a current signal amplifying unit 202 and a current signal detecting unit 203.

The optical signal collecting unit 201 may collect an optical signal indicating a palmprint information and convert the collected optical signal into a current signal, wherein the optical signal is obtained when a light emitted from a back light being reflected by a palmprint of a user palm. The palmprint information may comprise such as important line features on a palm, for example, a ridge line and a valley line. The palmprint information is carried by the reflected optical signal which is obtained when a light emitted from a back light being reflected by the valley line or the ridge line. Furthermore, a leakage current of a LTPS thin film transistor (not shown) in the optical signal collecting unit 201 relates to the intensity of the optical signal, i.e. a higher leakage current comes with a higher intensity of the light. Thus, the current signal which is converted from the optical signal may also carry the palmprint information.

The current signal amplifying unit 202 may be connected to the optical signal collecting unit 201 and configured to amplify the converted current signal. The current signal amplifying unit 202 may further configured to compensate for a threshold voltage of a driving transistor (not shown) included therein, so as to keep the amplified current signal stable.

The current signal detecting unit 203 may be connected to the current signal amplifying unit 202 and configured to detect an intensity of the amplified current signal. Since the intensity of the current signal may indicate a ridge line or a valley line of the palmprint in the palmprint information, the recognition of the palm can be realized by detecting the intensity of the current signal.

The palmprint recognition circuit 200 according to the present disclosure is based on a low temperature poly-silicon (LTPS) technology. For example, for a LCD display panel, there are a lot of advantages for utilizing a poly-silicon liquid crystal material, for example, the LTPS thin film transistor circuit can become thinner and smaller, and can have a lower power consumption. However, there is no palmprint recognition circuit based on the LTPS technology currently, thus, the proposed disclosure can solve such a problem.

Figure 3:
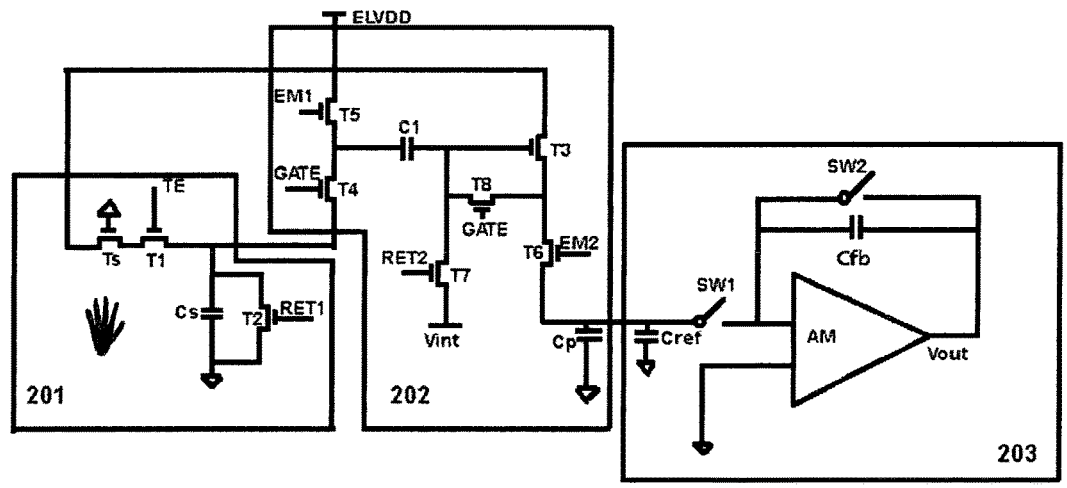
FIG. 3 is a circuit diagram illustrating the palmprint recognition circuit according to another embodiment of the present disclosure.
Figure 4:
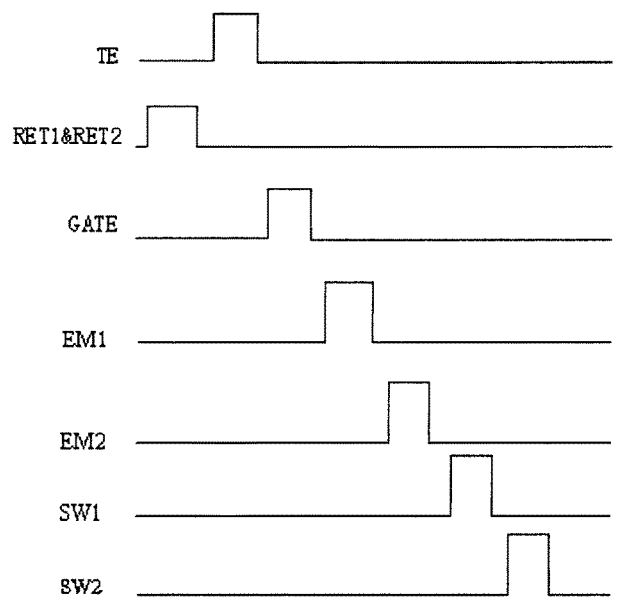
FIG. 4 is a timing diagram illustrating the palmprint recognition circuit according to another embodiment of the present disclosure.

The specific structure and the operational timing diagram of the palmprint recognition circuit according to another embodiment of the present disclosure will be discussed in detail with reference to FIGS. 3 and 4. FIG. 3 shows a specific diagram of the optical signal collecting unit 201, the current signal amplifying unit 202 and the current signal detecting unit 203 comprised in the palmprint recognition circuit. FIG. 4 shows a timing diagram of controlling signals of the controlling terminals ELVDD, EM2, EM1, GATE, RET1, RET2 and TE in the palmprint recognition circuit.

The optical signal collecting unit 201 may comprise a photoelectric conversion device Ts, a first transistor T1, a second transistor T2 and a first capacitor Cs. The photoelectric conversion device Ts is configured to convert the collected optical signal into the current signal, wherein the converted current signal is proportional to the collected optical signal. In particular, when the photoelectric conversion device Ts is in a turned off state, the light emitted from the back light is reflected by the palm and then directed to the photoelectric conversion device Ts, which may cause the photoelectric conversion device Ts to generate a leakage current Ioff. The leakage current Ioff relates to the intensity of the optical signal, i.e. a higher leakage current Ioff comes with a higher intensity, and a lower leakage current Ioff comes with a lower intensity. The intensity indicates the palmprint information, i.e. a higher intensity indicates the valley line of the palmprint, and a lower intensity indicates the ridge line of the palmprint. Accordingly, a higher leakage current indicates for the valley line of the palmprint, and a lower leakage current indicates for the ridge line of the palmprint. Thus, the recognition of the palm can be realized by detecting the leakage current Ioff. Preferably, the photoelectric conversion device Ts is a LTPS thin film transistor.

The first transistor T1 has a first electrode connected to a second electrode of the photoelectric conversion device TS, a second electrode connected to a first terminal of the first capacitor Cs, and a gate connected to a transfer controlling terminal TE. By setting the controlling signal of the transfer controlling terminal TE to a high level, the first transistor T1 is turned on, such that the current signal carrying the palmprint information is transferred to the first terminal of the first capacitor Cs from the first transistor T1, and then stored as a data voltage signal Vdata. Accordingly, the data voltage signal Vdata also registers the palmprint information. The second transistor T2 has a first electrode connected to the first terminal of the first capacitor Cs, a second electrode connected to a second terminal of a first capacitor Cs, and a gate connected to a first resetting terminal RET1. By setting the first resetting terminal RET1 to a high level, the second transistor T2 causes the first capacitor Cs to discharge under the control of the first resetting terminal RET1. In the embodiment, the gate of the photoelectric conversion device Ts, the second terminal of the first capacitor Cs and the second electrode of the second transistor T2 are all connected to the ground. Furthermore, in the embodiment, the photoelectric conversion device Ts, the first transistor T1 and the second transistor T2 may use a source as the first electrode and use a drain as the second electrode, and vice versa.

The current signal amplifying unit 202 comprises a third transistor T3 (i.e. a driving transistor), a fourth transistor T4, a fifth transistor T5, a sixth transistor T6, a seventh transistor T7, an eighth transistor T8 and a second capacitor C1. The fourth transistor T4 has a gate connected to a gate line GATE, a first electrode connected to the first terminal of the first capacitor Cs, and a second electrode connected to a first terminal of the second capacitor C1. The second terminal of the second capacitor C1 is connected to a second electrode of the eighth transistor T8. The eighth transistor T8 has a gate connected to the gate line GATE, and a first electrode connected to a first terminal of the third transistor T3. By setting the transfer controlling terminal TE to a low level, the first transistor T1 is turned off. Meanwhile, by setting the gate line GATE to a high level, the fourth transistor T4 and the eighth transistor T8 are turned on, so as to input the data voltage signal Vdata from the first capacitor Cs into the first terminal of the second capacitor C1. The second terminal of the second capacitor C1 is connected to the gate of the third transistor T3. Since the voltage across the second capacitor C1 is the data voltage signal Vdata, when the data voltage signal Vdata is inputted into the gate of the third transistor, the third transistor T3 is turned on. After passing through the third transistor T3, a final voltage at the second terminal of the second capacitor C1 is Vdata−Vth, wherein the Vth is a threshold voltage of the third transistor T3. The fifth transistor T5 has a gate connected to the first light-emitting controlling terminal EM1, a first electrode connected to the first terminal of the second capacitor C1, and a second electrode connected to a high voltage terminal ELVDD. By setting the gate line GATE to a low level, the fourth transistor T4 and the eighth transistor T8 are turned off. Meanwhile, by setting the first light-emitting controlling terminal EM1 to a high level, the fifth transistor T5 is turned on, and other transistors are turned off. A voltage at the first terminal of the second capacitor C1 is changed into a high voltage Vdd, and a voltage at the second terminal of the second capacitor C1 is changed into 2Vdd−Vdata−Vth. The third transistor T3 has the first electrode connected to a first electrode of the sixth transistor T6 and a second electrode connected to the first electrode of the photoelectric conversion device Ts. The gate of the sixth transistor T6 is connected to a second light-emitting controlling terminal EM2. By setting the first light-emitting controlling terminal EM1 to a low level, the fifth transistor T5 is turned off. Meanwhile, by setting the second light-emitting controlling terminal EM2 to a high level, the sixth transistor T6 is turned on. A current Itest outputted from the second electrode of the sixth transistor T6 is as follows:

$$I_{test}=\tfrac{1}{2}K(V_{GS}-V_{th})^2=\tfrac{1}{2}K[V_{dd}-(2V_{dd}-V_{data}-V_{th})-V_{th}]^2=\tfrac{1}{2}K[V_{dd}+V_{data}]^2.$$

The current Itest is the amplified current signal from the current signal amplifying unit 202. From the equation, it is seen that the amplified current signal is independent from the threshold voltage Vth of the third transistor T3 (the driving transistor), which enables the amplified current signal to keep stable and being not influenced by a change of the threshold voltage caused by changing the process. Furthermore, the current signal depends on the data voltage signal Vdata, thus it also carries the palmprint information.

Furthermore, the seventh transistor T7 has a gate connected to the second resetting terminal RET2, a first electrode connected to an inputting voltage terminal Vint, and a second electrode connected to the second terminal of the second capacitor C1. By setting the second resetting terminal RET2 to a high level, the seventh transistor T7 is turned on and causes the second capacitor C1 to discharge under the control of the second resetting terminal RET2. At this time, the voltage at the gate of the third transistor T3 is 0, which turns the third transistor T3 off. It should be noted that after the palmprint recognition circuit detects the current signal, the first resetting terminal RET1 and the second resetting terminal RET2 are both set to a high level. Then, it goes into a next detecting period.

In the embodiment, the third transistor T3, the fourth transistor T4, the fifth transistor T5, the sixth transistor T6, the seventh transistor T7 and the eighth transistor T8 may use the source as the first electrode and the drain as the second electrode, and vice versa.

The current signal detecting unit 203 may comprise a first switch SW1, an operational amplifier AM, a third capacitor Cfb and a second switch SW2. A turn off time of the first switch SW1 is controlled by a clock, such that during the turn off time t, a lead-to-ground capacitor Cp in the current signal detecting unit 203 and a reference capacitor Cref inside a chip are charged by the amplified current signal (i.e. the current Itest). The turn off time t is required to be controlled exactly by the chip, such that it is enabled that during the turn off time t, the reference capacitor Cref cannot be fully charged.

The first switch SW1 is connected to the operational amplifier AM in series. When the first switch SW1 is turned on, the current Itest is detected via the voltage Vout from the operational amplifier AM. The relationship between the voltage Vout and the current Itest is as follows:

$$I\text{test}=V\text{test}*(Cp+C\text{ref})/t;$$

$$V\text{test}=V\text{out}*Cfb/(Cp+C\text{ref});$$

$$I\text{test}=V\text{out}*Cfb/$$

From the above equations, the current Itest is independent from the capacitances of the lead-to-ground capacitor Cp and the reference capacitor Cref inside the chip, which can eliminate an influence of a change of parasitic capacitance on the detection of the current, wherein the change of parasitic capacitance is caused by a change of a wiring manner in the circuit.

Furthermore, the third capacitor Cfb is connected to the operational amplifier AM in parallel. The second switch SW2 is connected to the third capacitor Cfb in parallel. The second switch SW2 is turned on during the turn off time t of the first switch SW2, so as to cause the third capacitor Cfb to discharge.

Thus, according to the present embodiment, the detected current signal from the operational amplifier AM only relates to the capacitance of the third capacitor Cfb and the turn off time t of the first switch SW1, irrespective of the changes of the circuit process and the wiring manner.

Figure 5:
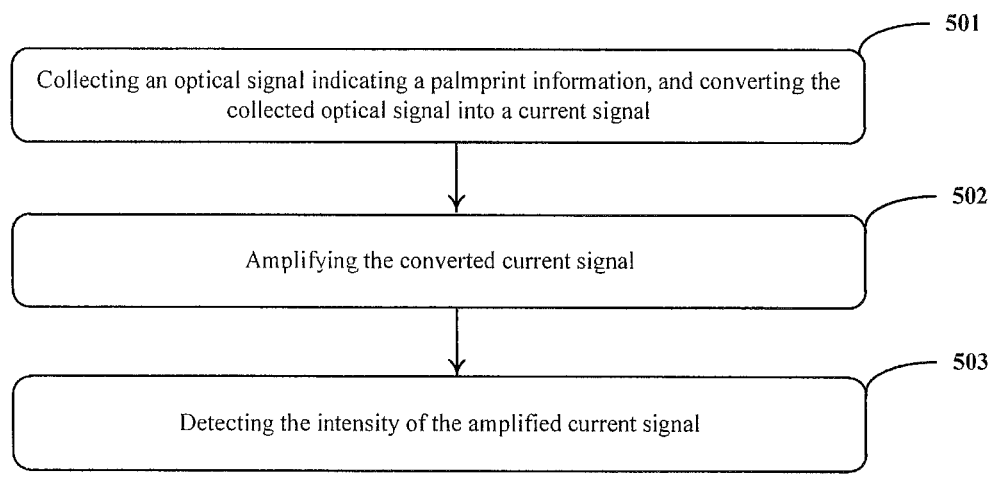
FIG. 5 is a flow chart illustrating a palmprint recognition method according to the embodiment of the present disclosure.

With reference to FIG. 5, a flow chart of a palmprint recognition method according to the embodiment of the present disclosure is described in detail.

At step 501, the optical signal collecting unit 201 collects the optical signal indicating the palmprint information and converts the collected optical signal into a current signal. The optical signal is obtained when a light emitted from a back light being reflected by a palm print of a user palm.

At step 502, the current signal amplifying unit 202 amplifies the converted current signal.

At step 503, the current signal detecting unit 203 detects the intensity of the amplified current signal. The intensity of the amplified current signal indicates a ridge line or a valley line of the palmprint in the palmprint information.

In the embodiment, the converted current signal is proportional to the collected optical signal.

In the embodiment, the palmprint recognition method further comprises: a step of compensating for a threshold voltage of a driving transistor in the current signal amplifying unit 202, so as to keep the amplified current signal stable.

In the embodiment, the current signal detecting unit 203 comprises a first switch, of which a turn off time is controlled by a clock, such that during the turn off time, a lead-to-ground capacitor in the current signal detecting unit and a reference capacitor inside a chip are charged by the amplified current signal.

In the embodiment, the current signal detecting unit 203 further comprises an operational amplifier connected to the first switch in series, wherein the intensity of the amplified current signal is detected via an output voltage from the operational amplifier, during a turn on time of the first switch.

In the embodiment, the current signal detecting unit 203 further comprises a third capacitor connected to the operational amplifier in parallel, wherein the detected current signal outputted from the operational amplifier only relates to a capacitance of the third capacitor and the turn off time of the first switch, and is independent from the lead-to-ground capacitor in the current signal detecting unit and the reference capacitor inside the chip.

Another embodiment of the present disclosure provides a display screen comprising the above palmprint recognition circuit 200. Display apparatuses which the display screen can be applied to may be any product or component having a display function, such as a liquid crystal panel, an electronic paper, a mobile phone, a tablet, a television, a displayer, a laptop computer, a digital frame, a navigator and the like.

Obviously, those skilled in the art can make various modifications and variations to the present disclosure without departing from the spirit and scope of the present disclosure. Thus, the scope of the present disclosure is defined by the appended claims and their equivalents.

We claim:

1. A palmprint recognition circuit based on a low temperature poly-silicon (LTPS), comprising:
    an optical signal collecting unit, configured to collect an optical signal indicating a palmprint information and to convert the collected optical signal into a current signal, wherein the optical signal is obtained when a light emitted from a back light being reflected by a palmprint of a user palm;
    a current signal amplifying unit, connected to the optical signal collecting unit and configured to amplify the converted current signal; and
    a current signal detecting unit, connected to the current signal amplifying unit and configured to detect an intensity of the amplified current signal which indicates a ridge line or a valley line of the palmprint in the palmprint information,
    wherein the current signal detecting unit comprises:
        a first switch, of which a turn off time is controlled by a clock, such that during the turn off time, a lead-to-ground capacitor in the current signal detecting unit and a reference capacitor inside a chip are charged by the amplified current signal.

2. The palmprint recognition circuit of claim 1, wherein the optical signal collecting unit comprises a photoelectric conversion device configured to convert the collected optical signal into the current signal, wherein the converted current signal is proportional to the collected optical signal.

3. The palmprint recognition circuit of claim 2, wherein the photoelectric conversion device is a LTPS thin film transistor.

4. The palmprint recognition circuit of claim 2, wherein the optical signal collecting unit further comprises a first transistor, a second transistor and a first capacitor, wherein the first transistor has a first electrode connected to a second electrode of the photoelectric conversion device, a second electrode connected to a first terminal of the first capacitor, and a gate connected to a transfer controlling terminal, and the first transistor is configured to transfer the converted current signal to the first capacitor which stores the transferred current signal as a data voltage signal, under the control of the transfer controlling terminal; and the second transistor has a first electrode connected to a first terminal of the first capacitor, a second electrode connected to a second terminal of the first capacitor, and a gate connected to a first resetting terminal, and the second transistor is configured to cause the first capacitor to discharge, under the control of the first resetting terminal.

5. The palmprint recognition circuit of claim 4, wherein the current signal amplifying unit further comprises a third transistor, a fourth transistor, a fifth transistor, a sixth transistor, a seventh transistor, an eighth transistor and a second capacitor, wherein
    the fourth transistor has a gate connected to a gate line, a first electrode connected to the first terminal of the first capacitor, and a second electrode connected to a first terminal of the second capacitor; the eighth transistor has a second electrode connected to the second terminal of the second capacitor, a gate connected to the gate line, and a first electrode connected to a first terminal of the third transistor, wherein the fourth transistor and the eighth transistor are turned on under the control of the gate line, so as to input the data voltage signal from the first capacitor into the first terminal of the second capacitor,
    the second terminal of the second capacitor is connected to a gate of the third transistor, so as to input the data voltage signal into the gate of the third transistor,
    the fifth transistor has a gate connected to a first light-emitting controlling terminal, a first electrode connected to the first terminal of the second capacitor, and a second electrode connected to a high voltage terminal, wherein when the fifth transistor is turned on under the control of the first light-emitting controlling terminal, a voltage at the first terminal of the second capacitor is changed into a high voltage, so that a voltage at the second terminal of the second capacitor is capable of cancelling out a threshold voltage of the third transistor, and
    the third transistor has the first electrode connected to a first electrode of the sixth transistor and a second electrode connected to a first electrode of the photoelectric conversion device, and the gate of the sixth transistor is connected to a second light-emitting controlling terminal, wherein the sixth transistor is turned on under the control of the second light-emitting controlling terminal, and the amplified current signal outputted from the second electrode of the sixth transistor is independent from the threshold voltage of the third transistor, so that the amplified current signal remains stable.

6. The palmprint recognition circuit of claim 1, wherein the current signal detecting unit further comprises:
    an operational amplifier, connected to the first switch in series, and configured to detect the intensity of the amplified current signal, during a turn on time of the first switch;

a third capacitor, connected to the operational amplifier in parallel; and a second switch, connected to the third capacitor in parallel, and configured to be turned on during the turn off time of the first capacitor, so as to cause the third capacitor to discharge, wherein the detected current signal outputted from the operational amplifier only relates to a capacitance of the third capacitor and the turn off time of the first switch.

7. A palmprint recognition method based on a low temperature poly-silicon (LTPS), comprising:

collecting an optical signal indicating a palmprint information and converting the collected optical signal into a current signal, by an optical signal collecting unit, wherein the optical signal is obtained when a light emitted from a back light being reflected by a palmprint of a user palm;

amplifying the converted current signal by a current signal amplifying unit; and detecting an intensity of the amplified current signal which indicates a ridge line or a valley line of the palmprint in the palmprint information, by a current signal detecting unit;

wherein the current signal detecting unit comprises:

a first switch, of which a turn off time is controlled by a clock, such that during the turn off time, a lead-to-ground capacitor in the current signal detecting unit and a reference capacitor inside a chip are charged by the amplified current signal.

8. The palmprint recognition method of claim 7, wherein the converted current signal is proportional to the collected optical signal.

9. The palmprint recognition method of claim 7, further comprises: compensating for a threshold voltage of a driving transistor in the current signal amplifying unit, so as to keep the amplified current signal stable.

10. The palmprint recognition method of claim 7, wherein the current signal detecting unit further comprises an operational amplifier connected to the first switch in series, wherein the intensity of the amplified current signal is detected via an output voltage from the operational amplifier, during a turn on time of the first switch.

11. The palmprint recognition method of claim 10, wherein the current signal detecting unit further comprises a third capacitor connected to the operational amplifier in parallel, wherein the detected current signal outputted from the operational amplifier only relates to a capacitance of the third capacitor and the turn off time of the first switch, and is independent from the lead-to-ground capacitor in the current signal detecting unit and the reference capacitor inside the chip.

12. A display screen, comprising the palmprint recognition circuit of claim 1.

* * * * *